United States Patent [19]
Lapeyre

[11] Patent Number: 4,631,700
[45] Date of Patent: Dec. 23, 1986

[54] MAGNETICALLY CODED SOFTWARE FOR MULTI-PURPOSE COMPUTER

[75] Inventor: James M. Lapeyre, New Orleans, La.

[73] Assignee: The Laitram Corporation, New Orleans, La.

[21] Appl. No.: 522,234

[22] Filed: Aug. 11, 1983

Related U.S. Application Data

[63] Continuation-in-part of Ser. No. 460,004, Jan. 21, 1983.

[51] Int. Cl.⁴ .......................... G06F 9/06; G06F 15/08
[52] U.S. Cl. ............................... 364/900; 340/365 VL
[58] Field of Search ... 364/200 MS File, 900 MS File, 364/709; 235/419, 435; 360/1, 2; 340/365 VL, 365 R, 711, 712

[56] References Cited

U.S. PATENT DOCUMENTS

| | | | |
|---|---|---|---|
| 3,187,321 | 6/1965 | Kameny | 340/365 VL |
| 3,560,964 | 2/1971 | Bedell | 340/365 VL |
| 3,600,592 | 8/1971 | Mahan | 340/365 VL |
| 3,967,273 | 6/1976 | Knowlton | 340/365 S |
| 4,030,094 | 6/1977 | Anderson | 340/365 R |
| 4,063,221 | 12/1977 | Watson | 340/365 R |
| 4,125,742 | 3/1979 | Olander | 340/365 R |
| 4,274,081 | 6/1981 | Nomura | 340/365 VL |
| 4,279,021 | 7/1981 | See | 364/900 |
| 4,280,121 | 7/1981 | Crask | 364/709 |
| 4,546,435 | 10/1985 | Herbert | 364/300 |

Primary Examiner—Raulfe B. Zache
Assistant Examiner—Florin Munteanu
Attorney, Agent, or Firm—Laurence R. Brown

[57] ABSTRACT

A computer keyboard matrix overlay panel carries indicia indicating the functions of keys and other operating instructions, to replace a significant part of the information formerly set forth in an external instruction manual. Individual panels are coded by incorporated switch parts acting with cooperating computer switch parts to set up a particular operating mode for which the respective key functions are identified when the panel is in place over the computer keyboard keys, the functions being selected by the use of two sequential, non-simultaneous keystrokes involving any of the keys on the keyboard. The panels also serve as software media by incorporation of data strips along panel edges to permit carrying program and data information external to the computer memory which is readable into the computer by corresponding transducers. The panel codes can change the comptuer mode and enter corresponding programs, subroutines, constants, and variable data. With three separate code strips: data, program steps and subroutines are isolated advantageously for entry at different times. Optically coded data strips are used for read only memory for program steps. Magnetically coded strips are used for read-write memory into corresponding reading apparatus coupled to the computer for data which is updated after processing in the computer.

12 Claims, 7 Drawing Figures

MAGNETICALLY CODED SOFTWARE FOR MULTI-PURPOSE COMPUTER

BACKGROUND ART

This application is a continuation-in-part of my copending application U.S. Ser. No. 460,004 filed Jan. 21, 1983 for Computer Keyboard Improvements.

TECHNICAL FIELD

This invention relates to computers in which some programs and data are carried on an external coded software accessory along with system operating instructions, and more particularly it relates to computers programmable to produce a plurality of operating modes in response to coded data carried on external coded data keyboard overlay panels.

In the present stage of the computer art, magnetically coded records for supplying program and data information to a computer are well known. Thus, for example, equipment commercially available from Hewlett-Packard, Corvallis Or. 97330 includes card readers (HP82104A) operable to read and write on a magnetic strip card. Thus, the Hewlett-Packard Model HP-75 computer line processes magnetic strip cards for entering data and program. Corresponding optically recorded data processing equipment is also well known.

There are, however, unresolved problems in the prior art, namely:

(1) Particularly in multi-function computer systems that adapt to different operating modes for special purposes, an instruction manual for showing operational differences has been a necessity to determine how to use a common keyboard. If the computer is portable, the operation manual may not be accessible.

(2) If new programs are developed for further computer operation modes, such as a program for calculating a particular function to aid salesmen to quote, there may be no available instruction manual or operating instructions. Thus, memorization of the keyboard and program capabilities by special schooling may be required. Also entry of a mass of special data may be necessary.

(3) There may be no simple way in most software accessories to segregate selectively for reading into the computer desired input data such as program, constants, variables, etc. A considerable amount of the computer program capability is necessary to isolate and read (or write) selectively the different sets of data into different memory bins. Also, extra routing data is required for special instructions on the software thus taking up storage space that could be used for other purposes.

(4) There is no convenient manner in which the keyboard keys are identifiable automatically with their respective functions over a plurality of different operational modes. That is, if a standardized arithmetic computer is converted to an alphanumeric data processor, the key functions may radically change. And further key function change is encountered if a still further mode such as geological engineering, etc. is available as an operating mode. The ultimate would be to automatically change the computer operating mode and a key function dictionary simultaneously.

The foregoing copending application provides for a graphic key overlay card with accompanying switch structure serving to select a specific computer operating mode having graphic indicia thereon to identify the function of the keyboard keys for that mode.

It is an objective of this invention to provide software to provide for the computer external data relating to mode selection, program selection and input of corresponding operating data, constants or variables in conjunction with an overlay card having graphic indicia thereon identifying the specific keyboard key functions for operating in the mode selected.

DISCLOSURE OF THE INVENTION

A matrix panel is provided for overlaying and registering with keys on a computer keyboard. The panel carries graphic indicia for identifying and explaining the function of the various keys in a designated mode of operation. This permits a modern computer chip to be more fully utilized by permitting an operator to use the keyboard in a plurality of different modes corresponding to selected modes of operation in the computer. The keys thus are spaced apart from each other in at least one direction to provide room for indicia adjacent the respective keys.

To enter external data or program into the computer that corresponds with a mode of operation graphically indicated on the panel, data storage means is carried on the panel. For example, one or more coded data strips along the edges of the panel can read into a computer strip reader accessory the program and accompanying data such as constants or variable data. Conversely updated data may be read out of the computer into the strips capable of read-write processing, for example, magnetic if desired.

Each panel may also carry coded switching means, for example, plug in switching sections coded on one end of the card for switching the computer automatically into a predetermined mode of operation, such as alphanumeric, geological engineering, tax computations, etc. within the capabilities of the particular programmable computer with which the panel cooperates. Thus, there is provided in a preferred embodiment external memory on a coded software keyboard overlay panel for use in a particular mode available in a multipurpose computer system.

THE PREFERRED EMBODIMENT

A computer keyboard system graphically displays on the face of a computer keyboard housing display panel adjacent the keys a selection of several graphic charts in the form of replaceable user readable function cards identifying manual key selected functions and their corresponding keystrokes. Thus, a plurality of replaceable graphic display card panels 40, comprising a matrix for overlying the keyboard panel through registering apertures, each relate to a different set of program functions which the computer is capable of processing. Therefore a set of selection switch actuating means 43-46 permits a computer mode of operation to be selected and held for activating the keyboard keys to operate with those functions relating to the indicia shown on the graphic display panel 40 when it is registered in visible position on the keyboard panel of computer 15.

In one embodiment, a single display panel 40 may be turned over with a different indicia function set on either side. Each panel side is coded by typically contact operating structure or internally detectable optical codes, etc. comprising switching means structure for actuating a switch, shown as end tabs or perforations which are located to electrically choose different sets of computer functions when the sheet is turned over to display a further set of keystroke indicia.

Accordingly, access by a simple keyboard is possible to hundreds of computer functions available on modern chips, while specifically designating key selections and sequences for all functions.

Figure 1:
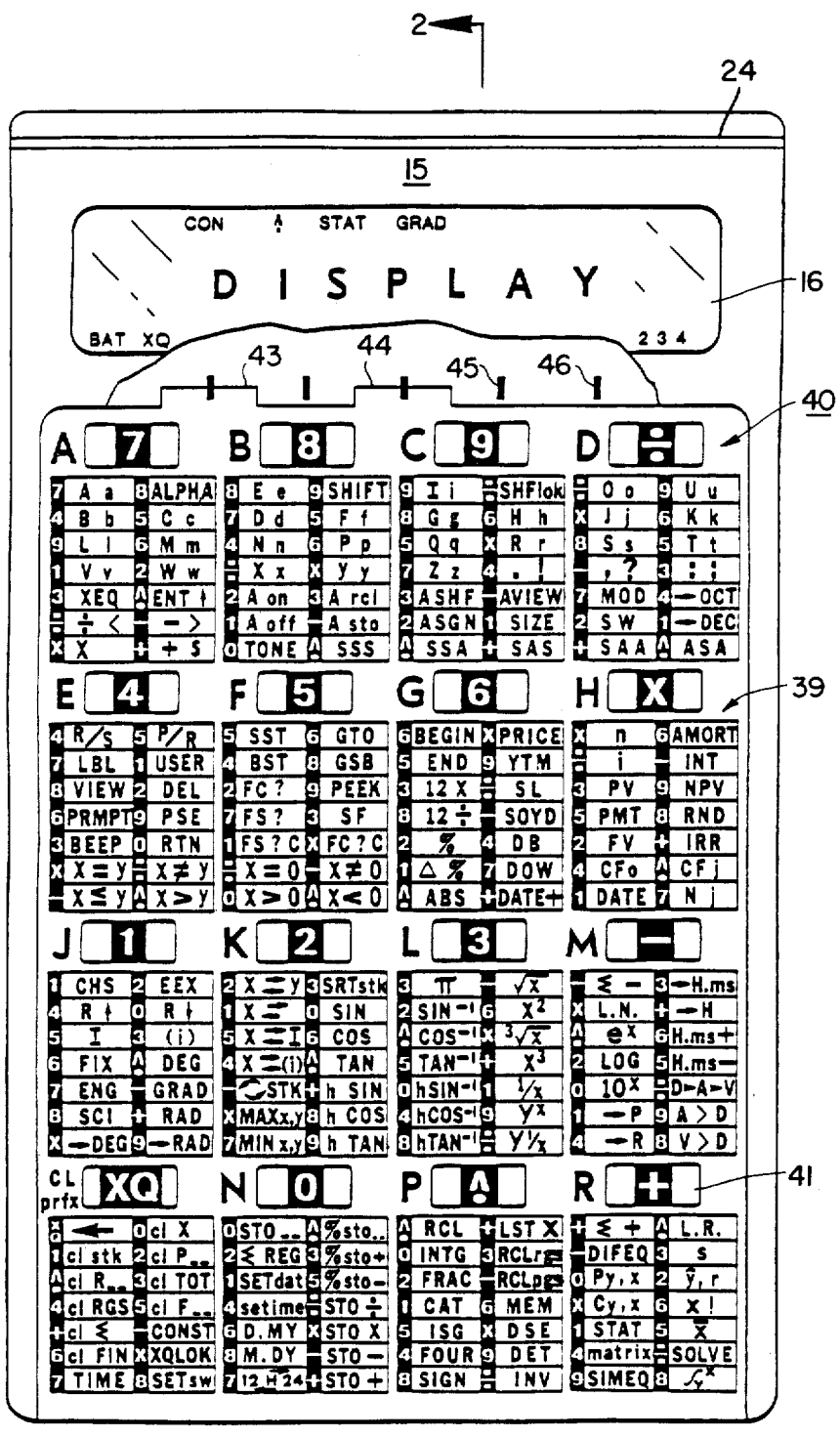
FIG. 1 is a partly broken away plan view of a computer with its keyboard registered with one of a plurality of differently coded overlay matrix panels having graphic indicia adjacent the respective keys to identify their function.
Figure 2:
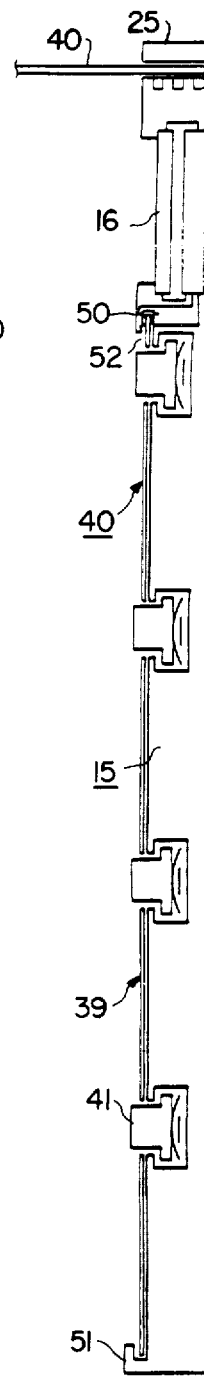
FIG. 2 is a side view sketch taken along lines 2—2 of FIG. 1 showing a built-in read/write head.

As seen in FIGS. 1 and 2, one embodiment of the invention comprises a computer 15 with a temporary electronic display panel 16 encompassing substantially the width of the keyboard housing front panel. The sixteen keyboard keys 41 are spaced apart to allow therebetween panel area zones 39 in which graphic indicia adjacent the keys can identify their function. Adjacent the keys 41 in the visible graphic display panel area 39 are charts showing the functions available in the computer. As shown, the sequence of two key strokes gives access to the corresponding functions identified by abbreviated indicia.

The chart therefore provides substantially all the information necessary to use the computer for any of its available functions. As seen from FIG. 1, for example, if the decimal digit key 3 is selected by a first stroke, the fourteen different functions listed under 3 are available by a second keystroke. Thus, 3—3 enters in the computer the value $\pi$ (3.14159) etc. Accordingly, the user is constantly reminded of the powerful repertoire of his instrument and little reference to an instruction manual is required with these graphic displays adjacent the keyboard.

The keyboard is changed over automatically for a different function set by a switch set in a similar manner as when a plug-in sub-chip of the prior art is inserted or the panel key switch as disclosed in U.S. Pat. No 3,892,958—July 1, 1975 to C. C. Tung is operated.

Selection is made in the computer of a mode that affects the functions of the keys. Thus, the visual display panel automatically displays a new set of functions by mating of the coded visual graphic display chart selections with a corresponding set of keystroke selections. It is evident that this feature has significantly expanded the keyboard capabilities to communicate with computer chip(s) having available many hundreds of built-in programs, functions and subroutines 48. The switching means can have other forms for automatic or even manual selection provided that the proper switches for function set selection are matched over the time period that the visible graphic display sheets are stably held in view. The panels 40 are held in place in their stable position by gravity or by suitable detent means (not shown). Preferably the switching is automatic when the display sheet is put into visible registration position by mating with suitable switch sets and is only changed when the next differently coded panel card is inserted. Thus, the card may be removed as later discussed to use for external data software purposes.

This keyboard overlay panel technique is particularly advantageous for portable computers because the entire repertoire of available built-in computer functions is prominently displayed alongside the keys. Thus, it is not necessary to carry along an instruction manual, which can be larger than the computer. However, the technique is also advantageous for operation of desk type or console computers. When computers are programmed for specialized disciplines, the manufacturer supplies the necessary panels 40 for insertion into position as the sole software accessory for switching over the computer, reading in the memory data and program, etc. 49 and displaying the keyswitch function therealongside.

A set of typical functions selectable from a standard computer chip are set forth on the graphic display panel shown. Since sixteen keys are available and fourteen selections are made by each key using the two keystroke principle hereinbefore briefly described, over two hundred selections are available on a single graphic display set. Thus, five such cards with different function sets on opposite sides to provide over 200 per side over two thousand selections can be displayed. In some cases a part of a function set may be carried through several display panels for the fundamental or overlapping functions required in a special field, etc. that requires a different set of functions overall.

These graphic displays have coding tabs 43, 44, etc. and mating switch sets 45, 46, etc. used in the general manner hereinbefore described to select different available matching sets of functions from the computer chip repertoire. Note that tabs 43, 44 are offset so that when the card 40 is reversed a new set of over 200 functions is selected by mating of different selection switches 45, 46, etc. with the coding tabs 43, 44, etc. on the graphic display panel optically read or mechanically operating selection switches, as desired. Thus, the visibly presented function set is always automatically connected for corresponding computer operation. The graphic display panel 40 is interlocked in the switch recess portion 50 at the display panel vicinity and at the bottom ridge 51 representing an appropriate clamp permitting entry of the panel and retention in stable position to hold the mating selection switches actuated for the time period that particular panel is in place.

When card 40 is in mated registration with a mechanical mating switch 52, the tab may separate or close switch contacts, as desired. The apertures in the card registering with keys 41 are also evident from the sketch of FIG. 2.

Figure 3:
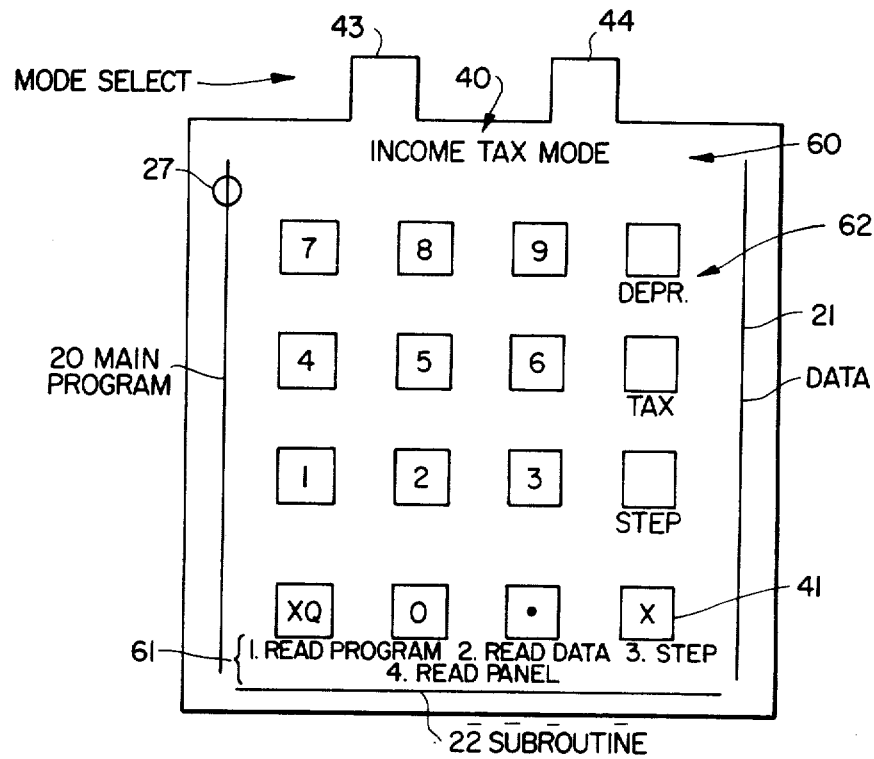
FIG. 3 is a plan view of the keyboard overlay matrix panel showing typical indicia, computer mode switching means and external data entry means in the form of three magnetic strips for carrying computer programs and associated constants or data entries.
Figure 4:
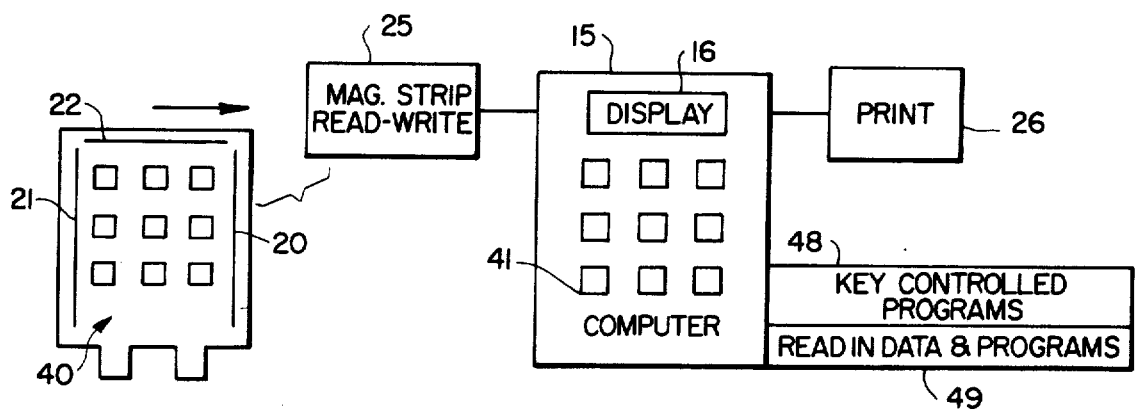
FIG. 4 is a block system diagram of a computer system with magnetic reader-writer attachment for processing data on the magnetic panel strips.

As better seen from FIGS. 3 and 4, this invention also provides means for entering any program, subroutine or data desirable for any particular computer operating mode selected by a particular panel. A set of three magnetically or optically coded strips 20, 21, 22 is aligned along three straight edges of the panel keyboard overlay card 40 and can be read or written on in a conventional way by a coded strip reader-writer unit 25 such as the type hereinbefore described that is commercially available as an accessory for computer 15. This strip edge reader 25 is shown in the reading mode in FIG. 2 with panel card 40 in place in the reader slot 24 of FIG. 1. A printer 26 is also available as an accessory, and provides flexibility in printing out special data carried on the panel card 40.

Because of the data strip locations on three edges several advantages occur. Firstly, a lot of coded data may be stored. Secondly, program, subroutine and data may be segregated for separate entry at specified times in a program sequence. Also magnetic code strips can be either read only or erased and updated by the computer. If read only magnetic program card strips are used they may be confined to one edge and would then be coded such as by punching hole 27 at a specified location to prevent the computer from entering a write mode. Optical strips are desirable for read only memory since they could not be erased inadvertently by a strong magnetic field. The software panels may include both magnetic and optic data strips on different edges or the same edge for complete versatility and selectability of particular entries.

Typically the software system afforded by this invention permits several indicia levels. Thus, the matrix panel card identifies the mode of operation it establishes (60), gives instructions for computer operation (61) and identifies the key functions (62).

In operation, we can identify a simple exemplary mode of operation 60, identified as the income tax mode. Thus, the keys 41 affected by a mode change can carry indicia 62 on panel 40. Such functions as step and execute (XQ) program steps are identified as well as tax routines for figuring depreciation, tax, payroll, etc.

The indicia regarding general instructions 61 at the bottom of the panel can set forth a sequence such as displayed, namely: (1) read program [strip 20], (2) read data [strip 21], (3) step program and read display panel [16 upon which printed out instructions such as execute, enter dividend, etc. can appear], and (4) take action specified on the display panel.

Figure 5:
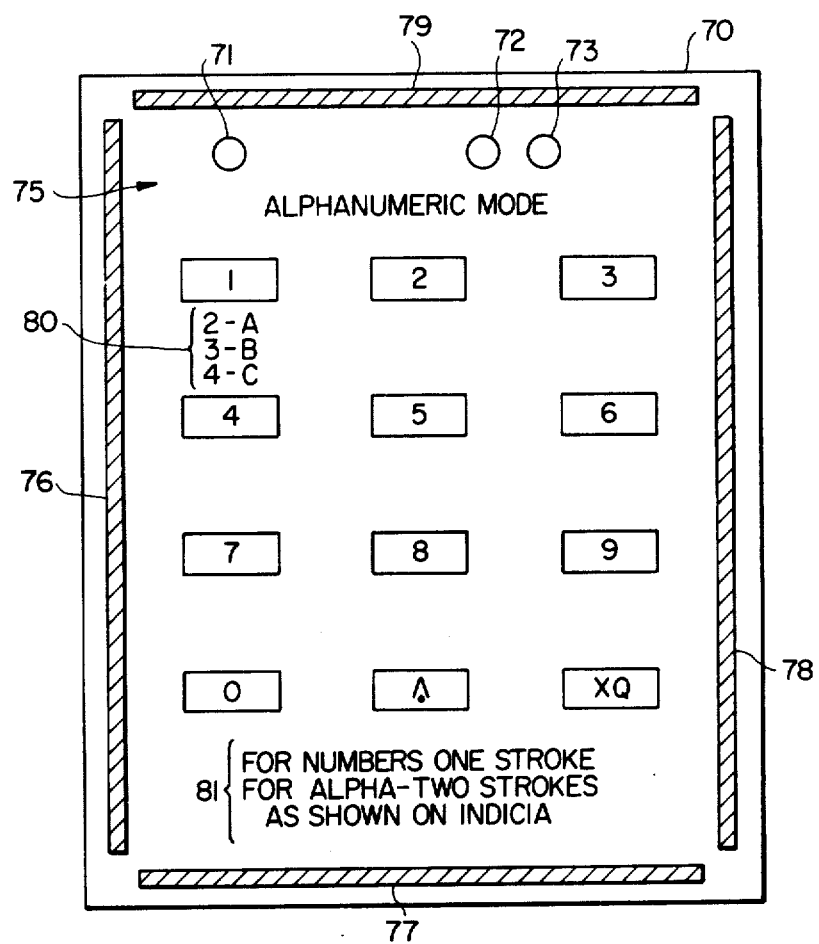
FIG. 5 is a plan view sketch of another keyboard overlay matrix panel embodiment as is the related FIG. 6 variation with its segmental detailed view of FIG. 7.
Figure 6:
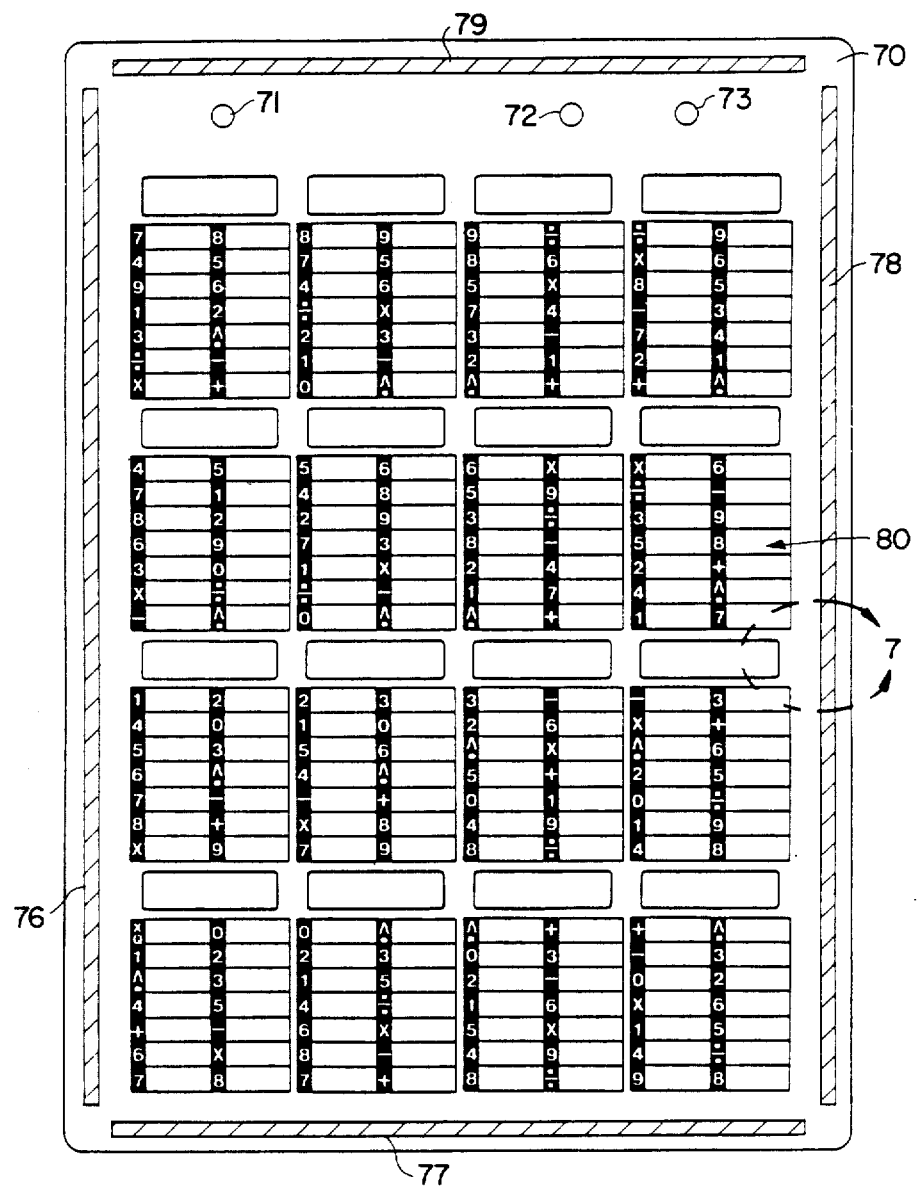

As may be seen in FIGS. 5 and 6, the overlay panel of FIG. 3 may be modified to make a fourth edge 70 available for a further set of data strips, by a simple change of the mode select switching means structure. Thus, for example, apertures 71, 72, 73 may be punched through the card panel 75 for actuating optic or electrical sensing switching means. This version would have particular utility for example if the panel is reversible for two different modes, where two data strips 76, 77 are available for the mode set forth on one panel side and two more 78, 79 are available for the mode on the other side.

An exemplary mode is shown encompassing alphameric capabilities with only twelve keys, wherein the numeric keys are live, requiring only one stroke per selection. However, an alpha mode for permitting two strokes for each key selection may be established by selection of the execute key (XQ) to permit access to the alpha characters designated alongside the keys on the indicia 80, etc. A non-numeric operating mode may be selected to automatically determine when a two key sequence is made, requiring the entry key to be used only in numeric mode after a sequence of numerical digits constitute a word. This FIG. 5, FIG. 6 embodiment illustrates the powerful software capabilities plus the ability to use different computer modes without reference to an operating manual by means of appropriate instructions 81 and key legends 80 on the overlay panel carrying the data strips 76 to 79. The panel can thus carry varied information in large amounts.

Figure 7:
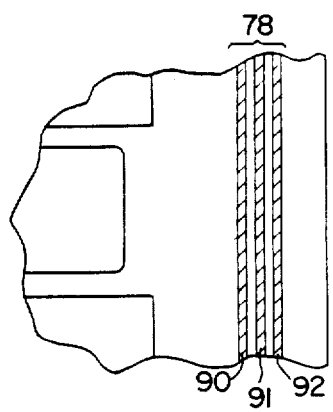

Other variations may be adopted without departing from the scope of this invention, as shown for example in FIG. 7. The magnetic "strip" 78 may constitute the three separate tracks 90, 91, 92 (or more), as for example four parallel tracks for (BCD) binary coded decimal data. As shown track 90 is hatched to indicate a read only optical track and tracks 91, 92 are hatched to show magnetic metallic tracks for read-write capabilities. These would be particularly useful in accounting or inventory modes of operation to carry updated information accessible when that panel is next used, but not clogging the limited data capacity of the computer.

The blank spaces 80 in the panel 70 of FIG. 6 permit a computer operator to custom tailor a special purpose mode of keyboard operation that carries therewith corresponding program, data and memory places for retaining updated information in the various medium strips 76 to 79. Thus, the keyboard operating instructions, program, constants, etc. and updated computed results (such as ledger accounts) are consolidated on the single accessory panel 70. The medium may be read in place on the keys or in a separated position by appropriate data reading means. The coded apertures 71, 72, 73 may operate switches by mating with spring biased contacts when the card is in place to select a particular mode of operation identifiable with the graphic indicia placed in the blank spaces 80 for functioning of those keys in any selected set. Alternatively data may be read from one of the medium strips 76 to 79 to program or otherwise establish a desired special mode for the particular key operations specified.

This software accessory is particularly useful for custom made programs for a particular industry, sales technique or engineering problem, for example. It can serve as a source of program instructions for many types of data processing operations, which has the unique property of serving as instruction manual, storage medium and updating accessory to take advantage of the latest developments in programs and operational techniques.

It is evident therefore that this invention has improved the state of the art in providing a novel software system. Accordingly, those novel features believed descriptive of the spirit and nature of the invention are defined with particularity in the claims.

I claim:

1. A software accessory system for a computer data processing system having a coded data strip reading transducer attachment, a manual keyboard with a plurality of keys and internal data processing capabilities of changing operational modes, receiving and storing data and program instructions from either said reading transducer or said keyboard, comprising in combination, a self supporting keyboard key overlay matrix panel defining a plurality of straight edges and having structure thereon for mating with a set of the keyboard keys to permit manual operation of the keys, program control means in said computer data processing system activating individual keys to enter a plurality of data and instruction functions greater than the number of keys in response to combinations of more than one keystroke per entry, graphic indicia on the panel identifying respective individual ones of the keys for indicating a plurality of operational functions attainable by those individual keys by said combinations of keystrokes, coded data means comprising at least one coded data storage strip disposed along one straight edge of the panel for presenting in coded format for reading data and instructions into the computer data processing system by means of said transducer attachment, software storage means in said computer system for storing data read from the strip by said transducer for access by the computer data processing system as data and instructions for use in data processing operations and mode selection means responsive to said coded data means on the panel for inplementing an operational mode in the computer data processing system enabling the keys to perform those operational fucntions displayed by the graphic indicia on the panel.

2. The accessory system defined in claim 1 including in combination therewith coded switch actuating means disposed on the panel as part of the coded data means, switching means in said computer data processing system responsive to said coded switch acutating means, and means in said computer for establishing a plurality of modes of operation in response to said coded switch actuating means.

3. The accessory system defined in claim 1 wherein the coded data storage strip comprises a magnetic strip upon which data may be written, and including means in the computer data processing system for writing information on said strip.

4. The accessory system defined in claim 1 including at least two separate coded data storage strips along two corresponding edges of the panel.

5. The accessory system defined in claim 4 including program instructions recorded on one said coded data storage strip and data to be processed recorded on the other said data storage strip.

6. The accessory system defined in claim 1 wherein the panel has at least three straight edges with coded data storage strips positioned therealong.

7. The accessory system defined in claim 1 wherein the coded data storage strip is magnetic and the computer data processing system has both a strip reading and a strip recording mode of operation, including means in said computer data processing system for transferring data from said computer to said strip in the recording mode.

8. The accessory system defined in claim 1 including further graphic indicia on said panel indicating to an operator a sequence of manual procedures for operating said computer data processing system and software accessory.

9. The accessory system defined in claim 1 wherein the panel further has coded control mode switching means thereon and the computer data processing system has mating switching structure for establishing a control mode when the panel switching means is connected to the mating switching structure with the panel in place on the keyboard.

10. A system as defined in claim 1 having said panel with a plurality of coded data strips along one or more panel edges wherein each strip comprises a magnetic layer, said computer data processing system having write means for writing data on the strips, and one strip having a selectively removable section for independently converting that strip to a read-only status disabling the write means.

11. The system of claim 1 wherein the software storge means comprises means for cooperating with at least one magnetic strip for both writing and reading of data, and the computer data processing system includes means for writing data processed thereby selectively upon the strip.

12. The system of claim 1 wherein the coded data means for entering instructions into the computer data processing system comprises a combination of magnetically coded and optically coded data strips positioned at different panel locations on said overlay panel.

* * * * *